Mar. 3, 1925.

B. E. BRIERTON 1,528,192

OPTICAL METHOD AND INSTRUMENT

Filed March 23, 1923

Patented Mar. 3, 1925.

1,528,192

UNITED STATES PATENT OFFICE.

BENJAMIN E. BRIERTON, OF BIRMINGHAM, ALABAMA.

OPTICAL METHOD AND INSTRUMENT.

Application filed March 23, 1923. Serial No. 627,126.

*To all whom it may concern:*

Be it known that I, BENJAMIN E. BRIERTON, a citizen of the United States, and resident of Birmingham, in the county of Jefferson and State of Alabama, have invented new and useful Improvements in Optical Methods and Instruments, of which the following is a specification.

The invention relates to an optical device in which transparent liquids are employed as vehicles for ocular remedies and as refractive mediums cooperative with other artificial refractive bodies employed in refraction by said device, making same readily adaptable for a medical appliance, an optical device, or an optometrical instrument.

The principle upon which the invention is founded is neutralization of the refractive power of the cornea of an eye by the surface of a circumfluous liquid body juxtaposited before said eye and compensating same for its reduced refracting power with artificial refractive bodies. That is, the cornea's refractive power is reduced to zero by the surface of a liquid-body that is curved to the same radius of curvature as that of the corneal surface when the cornea is sunk in said liquid-body having a refractive index equal to that of the corneal medium; the curvature of one surface neutralizes the curvature of the other surface while the refractive index of one medium neutralizes the refractive index of the other medium with the result that the two bodies become as one unitary body of refractive medium and the necessary amount of convergence of light rays as they pass through the two bodies of medium to fall upon the crystalline lens to receive its refractive action must be, and is, produced by an artificial refractive body before said light-rays have passed the liquid and corneal surfaces.

The principle described above is utilized in the present invention as follows: A pair of ocular-tubes is provided, each of which has a flat, transparent closure at one end while its opposite end is open and curved to fit circumferentially the anterior portion of an eye; thus said ocular-tubes are adapted not only to contain liquid but also to retain said liquid in contact with the surface of the anterior portion of said eye when its cornea is sunk in said liquid, and also to admit light-rays through said liquid and tube to said eye. To functionally cooperate with the ocular-tubes there is provided a second pair of tubes, each of which screws telescopically on an ocular tube; and to refractively cooperate with the liquid contained in an ocular-tube and with the refractive mediums and refractive surfaces of said eye each second-tube is provided with a positive lens, secured in vertical position in its free end while its telescopic movement adapts said lens to focal adjustment relatively to that portion of the ocular dioptric system that has not undergone neutralization by the surface of the liquid contained in the ocular tube.

To adapt the device for use as a medical appliance one or both ocular-tubes may be filled with a liquid medicament; said medicament may be any one of the following medical agents suspended in a liquid vehicle, i. e., an antalgic, an antalkaline, an anodyne, an antiphlogistic, an antiplastic, an antipyic, an antiseptic, an anaplerotic, an astringent, a cycloplegic, a myotic, a mydriatic, a styptic, or any other drug suitable for ocular medication. To adapt it for use as a medical appliance and optical device the ocular-tubes would be filled with said liquid medicament and the lens-tubes adjusted on said ocular-tubes to adapt their lenses for aid to the vision. To adapt the device for use in mensuration an adjustable bar, bearing graduations, is mounted on its frame above each set of tubes so as to extend with its graduated end aligned with the open end of the lens-tube while its opposite end is provided with a pointer that is just over a small window in the ocular-tube; two such windows are provided in each ocular-tube to allow the operator to view the pole of the cornea while he adjusts the bar so that its pointer will be even with said pole after an adjustment of the positive lens carried in the lens-tube has been accomplished; said bar, with its pointer and graduations indicates the distance between the pole of the cornea and the positive lens and measures the refractive power of the cornea in diopters and fractions thereof. To cooperate with the ocular and second tubes there is provided a face frame, constructed with a plurality of adjustable members that adapt it to retain each ocular-tube in horizontal position and parallel with the other ocular-tube, and to position them in alignment directly outward from the orbits with their axes parallel with the axis of their respective eyes, and to carry the weight of the assembled device on the bridge of the nose, while said frame is secured on the face by means of a pair of extensible side-members with bowed extensions to fit back of the ears.

The objects of the invention are: first, to provide an improved method of ocular medication and a novel and improved instrument adapted to contain liquids as vehicles of ocular medicaments and as refractive mediums, to retain same in medicamental and refractive contact with eyes, and to adapt lenses in refractive cooperation with said liquids, the ocular refractive mediums and refractive surfaces of the dioptric systems of said eyes that will adapt them for vision during the process of medication; second, to provide an optometrical instrument for measuring the refractive power of the cornea of an eye in diopters by a method comprising neutralization of the refractive power of said cornea and compensating the eye for said neutralized power by adapting to it artificial refractive bodies of known refractive power and means for measuring the amount of refractive power furnished to the eye by said artificial refractive bodies; third, to provide an optical device that will be useful for determining what portion of the refractive power of the dioptric system of an eye is furnished by its cornea, and what proportion of same is furnished by the crystalline lens, by a method comprising measurement of the anterior focus of said eye as produced by said dioptric system and measurement of the refractive power of its cornea, then deducting the amount as found by the last measurement from the amount as found by the first measurement;
the remainder after said subtraction taken as the refractive power of the crystalline lens; fourth, to provide a binocular (or a monocular) glass that will adapt the eyes for standard vision when viewing objects placed at different distances from the eyes and at the same time have said objects to appear as if they were positioned much nearer to the eyes, thus bringing out more clearly the details of the objects viewed;
fifth, to provide a device constructed with means for adapting the vision of one eye for distant objects while adapting the fellow eye for vision at the near point, the vision of each eye being standard but the objects appearing as if they were much closer to each eye; sixth, to provide a device adaptable for demonstrating the inability of the crystalline lens of an eye to adapt the dioptric system of said eye for vision at its near point by a method comprising adapting its dioptric system, after neutralizing the refractive power of its cornea, for vision at the far point, or twenty feet, and then showing that the eye can not adapt itself for vision at near point without the assistance of more artificial refractive power added to that already in use when the eye is fixing distant objects, which same would not have to be added if the crystalline lens possessed the power of increasing its convexity, and thus its refractive power, to adapt its dioptric system for vision at its near point. When adapting said eye for distant vision, after neutralizing its corneal power, we employ all the positive lens power that the eye will accept and still have 20/20, or standard vision, and thereby we make certain that the crystalline lens is at its minimum convexity and refractive power so that if it was possible for it to change its convexity and increase its refractive power when the eye was directed to read at the near point it would readily do so, which we find it does not do.

These being among the objects of the present invention, the same consists of certain features of construction and combination of parts to be herein more fully described and then claimed with reference to the accompanying drawing illustrating a desired embodiment of the invention, in which

Figures 1, 2:
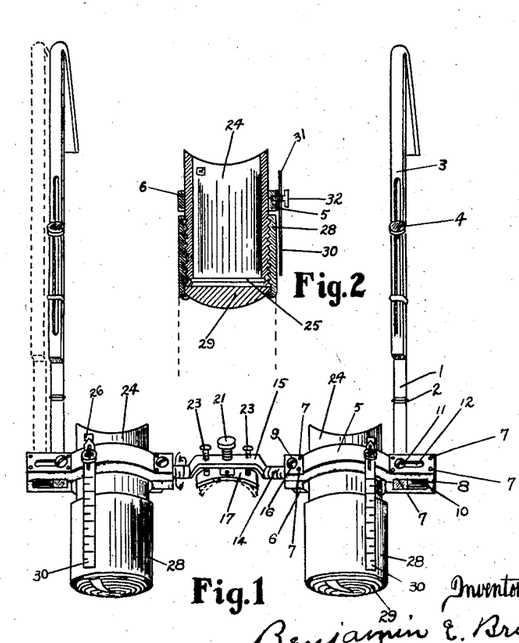
Figure 1 is a perspective view of the complete instrument.
Figure 2 is a sectional view of one liquid-containing ocular-tube and one lens-carrying-tube, the latter being shown engaged, by means of threads, on the ocular-tube; in this view is also shown the measuring bar extending, from its thumbscrew attachment on the frame, over the tubes, with the graduations on its one end aligned with distal end of the lens-tube and its pointer at the opposite end over a small window of the ocular-tube, two of which are provided in each ocular-tube for observing the pole of the cornea when it is sunk in the liquid contained in an ocular-tube and for setting the pointer even with said pole when employing the device as a measuring instrument.
Figure 3:
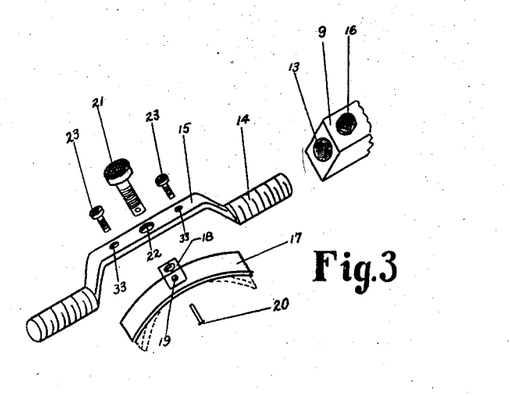
Figure 3 is a perspective view, on an enlarged scale, showing in detail and in detached relation the oscillating nosebridge-supporting and collar-connecting member, showing the graduation marks on the rounded journals at each end of same, the bearing for one of same in the end of a collar-member, the flexible nosebridge and means for connecting and operating it on said nosebridge-supporting member.

As shown, the frame is provided with a pair of side-members 1, each of which is comprised of two sections connected together by means of a hinge 2, which adapts said side-members to vertical adjustment without disturbing other parts of the device, an ear-engaging extension 3 adjustably secured to its side-member 1 by means of a thumbscrew 4 to adapt its bowed end to engage the back of the ear; a front, cooperative with said side-members 1, comprising a pair of collars, adapted to encompass and carry a pair of liquid-containing ocular-tubes 24, connected together by an oscillating nosebridge-connecting and adjusting member 15; each collar has an upwardly curved semicircular member 5 and a downwardly curved semicircular member 6; the latter engages the lower surface of an ocular-tube 24 and is secured by means of screws 7 to the under surface of the extensions 8 and 9 respectively, of member 5; said members 5, each encompassing the upper surface of an ocular-tube 24, are each formed at one end into a squared extension 8 which is provided with a recess 10, in which the end of a side-member 1 is adjustably secured, and the floor of which is formed by the end of the member 6; said recesses 10 are of sufficient length to allow of lateral movement, in either direction, of the side-members 1 to bring them in parallel alignment with the sides of the face and head, and when each of said side-members 1 is adjusted in its respective recess 10 it is secured against further movement by tightening the thumbscrew 11, the lower end of which is attached to the side-member 1 and adapted to move with it in either lateral direction in the slot 12; these members 5, at their opposite end, are each provided with another squared extension 9 in the end of which is a hollow bore 13, forming a bearing in which the graduated rounded portion, or journal, 14 of the nosebridge-adjusting member 15 hangs and is secured by means of a thumbscrew 16; thus when the two journals 14 of the member 15 are secured in their bearings 13 in the members 9 the collars are connected together and the frame is formed.

The member 15, with its rounded portions 14 fitted and secured in their bearings 13 of the members 9 of the collars as described, supports a pair of ocular-tubes 24, and in turn is supported on the nose by means of the nosebridge 17; said nosebridge 17 is made of suitable flexible material to allow of bending to changeable curvature to fit noses of various breadths, and bears on its upper surface, near its center, a small well-like extension 18 through which a hole 19 is bored to receive a taperpin 20 that connects the end of the thumbscrew 21 with said nosebridge 17; the thumbscrew 21 extends downward through a threaded bore 22 in the member 15 and is connected at its lower end with the flexible nosebridge 17 as described, adapting said thumbscrew 21 to raise and lower said nosebridge, thus raising and lowering the collars and their contained ocular-tubes 24, to adjust said tubes vertically to bring them to positions where their axes will be parallel with the axes of the eyes. Two other screws 23, of proper length, are fitted in threaded holes 33 of the member 15, and are adapted to screw downwardly and engage their rounded ends on the upper surface of the flexible nosebridge 17 to bend same curvedly over the bridge and around the sides of the nose. The rounded portions 14 of the member 15 each bear a graduated scale that adapts these members to be fitted into their respective bearings 13 to depths that will adjust the device to the predetermined interpupillary distance of a prospective wearer, as will be fully explained when dealing with the operation of the device.

The frame, with its assembled and adjusted members as described, supports on the face and before the eyes a pair of round, liquid-containing ocular-tubes 24, each one of which is closed airtight at one end by a transparent closure 25, preferably, and as shown, a disk of plane glass, which is cemented, or secured by other suitable means, in the end of the tube; the opposite end of each tube 24 is formed with an opening properly curved and suitably shaped to adapt same to fit circumferentially the anterior portion of an eye with its contained liquid juxtaposited in circumfluous contact with the cornea. The ocular-tubes 24 are made of hard rubber preferably, but they may be formed of other suitable material, and each tube should have a diameter somewhat shorter than the width of the palpebral fissure, as measured from the inner canthus to the outer canthus, to provide a tube of just the right caliber to engage the said anterior portion of the eye, either with the lids folded back or with the lids engaged by the end of the tube, the latter being preferable in most instances. Each ocular-tube is provided with a pair of diametrically opposite small windows 26 near its curved end, said windows have airtight closures of transparent material, preferably glass, which are cemented in said windows; each ocular-tube is threaded over a portion of its exterior surface from the closed end toward the windows 26, while a section of its unthreaded portion of surface is engaged by the roughened inner surface of the members comprising the collars already described; the inner surfaces of said collars are roughened to adapt said surfaces to grip the outer surface of the ocular-tubes which are adjusted in said collars and then secured against further movement by the screws 7 which engage threaded holes in the members 8 and 9 respectively, as described.

A second pair of tubes 28 is provided, each one of which is open at one end, threaded the whole length of its inner surface and adapted to screw telescopically on an ocular-tube 24 and carries a positive lens 29, preferably of plano-convex form, which is cemented, or secured by other suitable means, in the free end of the tube with its axis on a line parallel with the axis of said tube. These tubes 28, like the tubes 24, are made of hard rubber preferably, but may be made of other suitable material. Each positive lens 29, carried as it is in the end of the tube 28 adapted to screw telescopically on an ocular-tube 24, may be moved at the will of the operator or the wearer toward or away from the eye and positioned at a point where it will be in perfect refractive cooperation with the liquid in the ocular-tube, the ocular media, and the refractive surfaces of the dioptric system of the eye, the cornea of which is sunk in the liquid contained in said ocular-tube.

A pair of bars 30, each having a pointer 31 and graduation marks on its upper surface, are adjustably secured, one over each set of tubes by a thumbscrew 32 which screws into the upper surface of the member 5 of the collar; said bars are adjustably movable to allow the operator to adjust them so that their pointer 31 will point to the pole of a cornea as seen through the windows 26 when the cornea is sunk in the liquid of the ocular-tube; the graduations toward their opposite end are aligned with the end-edge of the lens-tube 28; thus, when the pointer 31 is adjusted even with the pole of the cornea where it shows through said windows 26 and the positive lens 29 has been adjusted to the point where its focus is in cooperative relation with the dioptric system of the eye to permit vision the amount of refractive power furnished by said positive lens 29 is indicated by a graduation on the bar at a point where the end-edge of said lens-tube 28 is aligned with said bar 30, and, the amount of refractive power furnished by said positive lens 29 being equal to the refractive power of the cornea that has been neutralized, we know at once what the refractive power of the cornea of the eye is by reading the finding on said bar 30.

It is obvious that one ocular-tube 24 and one lens-tube 28 may be placed in operative position in the frame and before an eye independently of the other set of tubes; that the device may be worn as a monocular device as well as a binocular device by leaving one set of tubes unmounted; that either set of tubes may be held by the hand in operative position before an eye; and that, in certain instances, the ocular-tube 24 of either set may be held to an eye by means of suction created when the liquid contained in said tube contacts with the anterior portion of the eye, and may carry its cooperative lens-tube 28.

With the foregoing description of the structure the operation of my instrument will be readily understood.

First we measure the interpupillary distance of the patient's eyes. Say that we find this to be 60 mm., we adjust each bearing 13 of the members 9 at 60 on the graduated portion 14 of member 15 and this places the axes of the ocular-tubes 24 just 60 mm. apart; we then set the thumbscrew 16 to temporarily tighten the members 9 on the members 14 and place the assembled device on patient's face and hook the bowed members 3 back of the ears, move the side-members 1 to positions in which they perfectly engage the sides of the face and head, loosen the thumbscrews 16 and oscillate the member 15 to an angle that allows the nosebridge 17 to assume an angle commensurate to that of the angle of the bridge of his nose, and again tighten the thumbscrews 16; next, we raise or lower said nosebridge 17, by means of the thumbscrew 21, to adjust the ocular-tubes 24, vertically, to a height that brings their axes parallel with the axes of his eyes, and then adjust the screws 23, screwing them downwardly until their ends have pushed the ends of the flexible nosebridge down and around to engage the sides as well as the bridge of his nose. The device is now suitably adjusted as to size and form to fit his face and we now remove it therefrom, and, holding it with its tubes vertical and with the open ends of the ocular-tubes 24 upward we are ready to fill said tubes with a suitable liquid, and—

To operate the device as an optometrical instrument and measure the refractive power of the cornea of an eye, and to determine what is the relative amount of refractive power furnished by said cornea as compared with the amount of refractive power furnished by the crystalline lens, we first measure the distance of the near point of each eye and make a record of same, (employing for this purpose the meter-stick and reading card, or any other device adapted to this purpose). We now fill the ocular-tubes with a transparent liquid (distilled water, having an index of refraction 1.33, like that of the corneal medium, will be best for this purpose), and adjust the device on his face and tell him to direct his eyes to look at a test-chart placed twenty feet from his eyes. He is not able to see said chart, as yet, because the liquid-body in each ocular-tube, having an index of refraction equal with that of the corneal medium, being in circumfluous contact with the corneal surface and having assumed a concave anterior surface with a radius of curvature equal to the radius of curvature of said corneal surface, has neutralized the refractive power of his cornea, with the result that parallel rays approaching the eye from said chart pass through the transparent closure of the tube, the liquid body, through the cornea and onward into the eye to fall upon the crystalline lens as parallel rays, and all refraction of said parallel rays must be accomplished by the surfaces of the crystalline lens. This eye, with its dioptric system reduced from three refractive surfaces to two refractive surfaces, is highly hypermetropic in its refraction and no image of the characters on said chart is formed on its retina; the parallel rays, refracted by the surfaces of the crystalline lens only, would come to a focus, but only at a point much farther away than the retina of patient's eye and said eye does not recognize the presence of any object at any distance except as a shadowy form. To furnish refractive aid to his eyes that will give them twenty-twenty vision at twenty feet we choose first, say the right eye, and screw a lens-tube 28 with its lens 29 on the ocular-tube before this eye, and, telling him to now fix the chart with his eye we revolve the tube 28 and move the lens 29 toward his eye until he can and does read the twenty-twenty line of characters.

To learn what was the refractive power in diopters of the said cornea before its neutralization, and to learn what is the refractive power of the crystalline lens, we now adjust the pointer 31, while we observe the pole of his cornea through the windows 26, and set the bar 30 so that the said pointer is even with said pole of the cornea and then look and see what graduation mark of the bar 30 is aligned with the end-edge of the lens-tube 28, and, say we find this to be the 44 D. mark, we know at once that the refractive power of his cornea, measured in diopters, equals 44 diopters, and, that the radius of curvature of its surface is 7.5 mm. And now, to compare the refractive power of said cornea with that furnished by the crystalline lens we look over our record to find the distance of the near point of the eye, and, we find that this is, say, 75 mm. which tells us that the refractive power of the complete dioptric system is 57.33 B. plus; then if the refractive power of the cornea is 44 D. plus, that of the crystalline lens is 13.33 diopters plus. With the positive lens 29 positioned as described above to permit vision at twenty feet, if it were directed to fix the reading card at the near point the eye would be unable to adapt its dioptric system for reading at this point, because the said crystalline lens does not possess the ability to increase its refractive power sufficiently for adapting the dioptric system for vision at the near point of the eye, and although this is contrary to the accepted theory of accommodation as given by text books, we may now prove it by having our patient to fix the said reading card held at 75 mm. distance from his eye at which point the eye has very blurred vision until the positive lens 29 has been moved away from the eye sufficiently to increase its refractive power over the rays before they reach the said crystalline lens to render the vision clear, and if we again take a reading from the bar 30 we may find that the refractive power added to the eye is now 49 diopters, i. e. 44 diopters added for corneal refraction for distance and 5 diopters added to the said corneal refraction at the near point. And now, because it is obvious that the procedure would be the same in adapting the other eye for vision in the same manner we will not repeat same but pass on to the method and operation of establishing and proving the presence or absence of crystalline lens or corneal astigmatism.

In this, we proceed as described above up to the point where we have adapted the device for twenty-twenty vision at twenty feet, and we now have our patient to direct his eye to fix the astigmatic chart at the same distance. The corneal refraction is all neutralized now and if he states that all lines appear equally black this eye has no lenticular astigmatism, while on the other hand, if certain lines do appear darker than all others then there is astigmatism of the lens because the cornea is not functioning in the refraction of rays. The lenticular astigmatism when found may be corrected by the employment of cylinders from the trial case if placed before the lens 29 with their axis at the right angle of inclination. If no astigmatism was shown while the device was adjusted for distant vision it would not necessarily prove the absence of corneal astigmatism; however, to prove whether there is corneal astigmatism all we need do is to remove the device and see if the unaided eye shows an astigmatic refraction, and if so we know that it is corneal astigmatism.

As a medical appliance the adaptation of the device to an eye is the same as that for measuring as described above, except that for this purpose the tube 24 is to be filled with a transparent liquid which, besides serving as a refractive medium, also serves as a vehicle of an ocular remedy or a medical agent that is applied in ocular treatment. It is obvious that any remedy or agent that is required in eye treatment may be applied to an eye by employing a liquid as its vehicle. To employ the device for treating the eye, we proceed as described above and adapt the device on one eye, with the remedy in circumfluous contact with its anterior portion, for vision at a distance, and, if the other eye needs no treatment we remove the tubes from before it and allow it to function naturally; however, if both eyes are to be placed under medical treatment at the same time we adapt the device on the second eye for vision at the near point by adjusting the lens 29 before it farther away from its cornea and in this way one eye may be used for distant vision while the other eye is used for near vision, but because the eyes are disassociated in their function and because the objects as seen by either eye appear as removed toward the eyes we instruct our patient to confine his movements to a near field until he becomes accustomed to this changed relation.

To employ the device as an instrument for demonstratively showing that the crystalline lens of an eye does not of itself possess the power to adapt its dioptric system for vision at the near point, a function known as "accommodation", we remove one set of tubes and cover that eye, and with the other parts of the device adjusted the same as for measuring a cornea we tell our subject to fix the distant chart with his aided eye while we adjust the lens 29 to a point where it will be adapted to his eye for twenty-twenty vision, and when he has named correctly every character on the 20/20 line, and after we have increased the positive lens power of the lens 29 until the crystalline lens has relaxed (if it does relax) to its minimum amount of refractive power, or convexity, we adjust the bar 30 to make the reading of the lens power in use and record the same. We now hand him a reading card, and measuring with the meter-stick the distance that is consistent with the near point for his age, we tell him to hold the card at that distance and attempt to read; he is unable to read any character on the card, whereas, if the crystalline lens possessed the power of increasing its convexity, and thereby its refractive power, it would now do so in order to adapt the eye for vision, and because it does not do so, we now move the lens 29 farther away from the eye and thus increase its refractive power relatively to the dioptric system, until he can read the smallest type on the reading card held at a distance equal to that of the near point for his age, and, to learn what this additional refractive power, in diopters, has been we again note what graduation is aligned on the bar 30 with the tube 28, and, say we learn that this is the 49 diopters graduation mark, while the former reading was 44 D., we know that we have added 5 diopters of refractive power to that which we had employed in lieu of the corneal refraction for distance to adapt the device on the eye for reading at the near point. If instead of moving the lens 29 farther away from the eye to increase its relative refraction, we had placed a plus 5 diopters lens before the lens 29 the result would have been the same, because the eye required five diopters more refractive power to change its focus from the far point to the near point, and, because we added this extra power to that employed in lieu of the neutralized corneal refractive power while the crystalline lens was allowed to function naturally at all times, it appears as if it is the cornea that changes its refractive power to adapt the eye for vision at the near point.

To adapt the device as an ocular device, or as a binocular device, to be worn as protector against injuries from various sources, it is adjusted substantially as described in the previous paragraphs, while the ocular-tubes 24 may be filled with any liquid suitable for the occasion; and, while the device may be adapted for many uses not described in these pages, the operation and technic, while not offered arbitrarily herein, will be practically the same.

In certain cases where the eye membranes are sensitive, or where there is liability of liquid escaping from the ocular-tubes, a thin layer of beeswax or paraffin may be applied over the end-surfaces of said tubes just before they are fitted to the eyes.

Although the elements set forth and described are well adapted to accomplish the purposes for which they are intended, it is to be understood that slight changes in the details of construction and arrangement of the parts may be resorted to without sacrificing any advantages or departing from the spirit of the invention.

The use of the term "dioptric", throughout this specification, is to convey that the refractive medium defined by dioptric, is a body that possesses a curved surface, or curved surfaces, suitable to refractively converge, or diverge, light rays and produce a focus of said light rays. A body of refractive medium having plane surfaces does not produce a focus of light rays, yet it may refract said rays.

Having fully described my invention and the method of operating the same, what I claim is:—

1. The herein described method of ocular treatment comprising applying liquid curative means and refractive means suitable for neutralizing the refractive effects of the liquid curative means.

2. The herein described method of ocular treatment comprising applying liquid medicative means and refractive means suitable for neutralizing the refractive effects of the liquid medicative means and rendering the vision substantially standard.

3. The herein described method of ocular treatment and adaptation of the eyes for vision during said treatment comprising applying suitable liquid as curative and refractive means and applying dioptric refractive bodies for converging light rays cooperative with the ocular medium and with said liquid.

4. The herein described method of ocular treatment comprising simultaneously applying liquid curative means and curved refractive means suitable for focusing light rays on the retina.

5. The herein described method of ocular treatment comprising simultaneously applying liquid curative means and dioptric means suitable for focusing light rays on the retina.

6. The herein described method of ocular treatment comprising applying liquids as curative and refractive means and lenses as refractive means cooperative refractively with said liquids and with the refractive mediums of the eye.

7. The herein described method of ocular treatment comprising applying liquids as curative means and lenses suitable for neutralizing the refractive effects of said liquids.

8. The herein described method of ocular treatment comprising applying liquid curative means and ray-converging means suitable for neutralizing the refractive effects of said liquid curative means and for focusing light rays on the retina.

9. The herein described method of ocular treatment comprising applying liquid curative means and lens means suitable for neutralizing the refractive effects of said liquid and to focus light rays on the retina.

10. The herein described method of ocular treatment comprising applying a liquid remedy in circumfluous contact with the eye and applying vision-aiding lens means suitable to neutralize the refractive effects of said liquid remedy and to focus light rays on the retina.

11. The herein described method of eye treatment comprising placing in apposition to the eyes tubes containing suitable liquid remedies, using said liquid remedies as curative means and using the liquid as a refractive medium to neutralize the refractive power of the cornea, and applying other refractive bodies suitable to neutralize the refractive effects of said liquid and to focus light rays on the retina.

12. The herein described method of treating the eye comprising applying in circumfluous contact with its anterior portion a liquid that carries in solution a medical agent; using said medical agent for curative means and using said liquid as a refractive medium to neutralize the refractive power of the cornea, and applying in position in front of said liquid a ray-converging body suitable to neutralize the refractive effects of said liquid and to focus light rays on the retina as aid to the vision.

13. The herein described method of rendering an eye refractively fit for vision during medical treatment comprising applying curative agents in liquid state and refractive means suitable to neutralize the refractive effects of said liquid and to focus light rays on the retina to render the eye refractively standard.

14. The herein described method of synchronous medication and refractive compensation of an eye comprising applying liquid curative means and artificial refractive means and approximating said artificial refractive means to the eye suitable to neutralize the refractive effects of said liquid curative means and to focus light rays on the retina to aid vision.

15. The herein described method of combining medical treatment with refractive aid for eyes comprising applying liquid bodies carrying remedies as curative means and applying artificial refractive bodies having established ray-converging power and approximating said artificial refractive bodies suitable for neutralizing the refractive effects of said liquid bodies and to focus light rays on the retina to aid vision.

16. The herein described method of ocular preventive medicine comprising applying a prophylactic agent in aqueous solution synchronously with dioptric refractive bodies and approximating the latter to the eye suitable to neutralize the refractive effects of said aqueous solution and to focus light rays on the retina.

17. The herein described method of ocular treatment comprising applying curative means in solution in a liquid refractive medium and applying plane and cooperative curved bodies of refractive medium suitable to cooperate with said liquid refractive medium and with the ocular refractive mediums to render aid to vision.

18. The herein described method of measuring the refractive power of the cornea of an eye comprising neutralizing all refractive power of said cornea by immersing it in a suitable liquid contained in a suitable device for maintaining said liquid in circumfluous contact with said cornea, and placing in front of said immersed cornea a refractive body of predetermined dioptric value and adapted to mensural adjustments and adjusting said refractive body to determine the number of diopters of refractive power that compensate the refractive system of the eye in lieu of the refractive power of the cornea neutralized by its immersion in said liquid.

19. The herein described method of determining the refractive power of the cornea of an eye comprising submerging said cornea in a suitable liquid body of predetermined refractive index and applying in front of said liquid body lenses of known refractive value and adjustable to vary their refractive value relatively to the refractive system of the eye and adjusting said lenses in the direction of the eye-axis to determine what the refractive value of the cornea is that has been neutralized by submerging it in said liquid body.

20. The herein described method of determining the refractive power of the cornea of an eye which comprises applying a liquid surface to said cornea to neutralize its refractive power and applying compensative refractive means suitably adapted to registering the diopters of compensative refractive means employed.

21. The herein described method of demonstrating that it is not the crystalline lens that produces the so-called accommodation, or adjustments of the refractive system of an eye for vision at the near point, or change of vision from the far point to the near point, which comprises total neutralization of the corneal refractive power by immersing it in a suitable liquid refractive medium and then compensating said refractive system for loss of its corneal refractive assistance by suitable adjustment of suitable refractive means to give the eye vision for the far point, or distance, then putting said compensated eye to the test of reading at the near point, ascertaining that it cannot do so, and then placing additional refractive means to cooperate with that formerly supplied and with said refractive system to render the vision good for the near point and thus proving that the crystalline lens does not increase its refractive power and change the vision from the far to the near point.

22. An apparatus for ocular treatment comprising means for applying a liquid curative means and means for neutralizing the refractive effects of the liquid curative means.

23. An apparatus for ocular treatment comprising means for applying liquid curative means and means for neutralizing the refractive effects of said liquid curative means and for aiding the vision.

24. An apparatus for binocular treatment comprising means for applying a liquid curative means and means for neutralizing the refractive effects of said liquid curative means and for refractively aiding the eyes.

25. An apparatus for ocular treatment comprising means for applying liquid curative means and liquid refractive means and other refractive means for neutralizing the refractive effects of said liquid curative and liquid refractive means and for refractively aiding the eye.

26. An ocular device comprising means for applying liquid curative means to both eyes and dioptric refractive means for neutralizing the refractive effects of said liquid curative means and for focusing light rays on the retina to aid the vision.

27. An ocular device comprising suitable tubes for applying liquids to eyes and means for applying refractive means suitable for neutralizing the refractive effects of said liquid and for focusing light rays on the retina and to render the vision substantially normal.

28. An ocular device comprising tube means for applying liquid curative and refractive means and other tube means for applying lens means suitable to neutralize the refractive effects of said liquid and to focus light rays on the retina to render the vision substantially normal.

29. An ocular device comprising tube means for applying liquid curative means and refractive means, frame means for supporting same on the face and other tube means and lens means adaptable to adjustments and to cooperation with said first tube means and said liquid refractive means to neutralize the refractive effects of said liquid refractive means and to focus light rays on the retina to render the vision substantially normal.

30. An optical device of the character described comprising a pair of ocular-tubes, cooperative with each other, each having a flat, airtight, transparent closure to its one end and its opposite end open and suitably curved and shaped to fit circumferentially the anterior portion of an eye and adapted to contain and retain a liquid body in circumfluous contiguity with the anterior surface of said eye and admit light rays through said liquid to said eye, and a pair of small cornea-observing windows substantially as set forth.

31. An optical device of the character described comprising an ocular-tube having its open end curved and shaped to fit the anterior portion of an eye, its opposite end closed airtight by a plane, transparent closure to adapt it to contain and retain a liquid body in circumfluous contiguity with the anterior surface of said eye and admit light rays to same, means for engaging over its closed end and on its exterior surface a second tube, and a second tube carrying a lens substantially as and for the purpose set forth.

32. An optical device of the character described comprising two cooperative ocular-tubes, each one having its open end curved and shaped to fit the anterior portion of an eye, its opposite end closed airtight by a plane, transparent closure to adapt it to contain and retain a liquid body in circumfluous contiguity with the anterior surface of said eye and admit light rays to same, means for engaging over its closed end and on its exterior surface a second tube, and a second tube carrying a lens substantially as and for the purpose set forth.

33. An optical device of the character described comprising an ocular-tube having its open end curved and shaped to fit the anterior portion of an eye, its opposite end closed airtight by a plane, transparent closure to adapt it to contain and retain a liquid body in circumfluous contiguity with the anterior surface of said eye and admit light rays to same, threaded means of engaging a second tube on its exterior surface, a second tube and a second tube, carrying a lens, cooperative with said ocular-tube.

34. An optical device of the character described comprising two ocular-tubes cooperative with each other, each one having its open end curved and shaped to fit the anterior portion of an eye, its opposite end closed airtight by a plane, transparent closure to adapt it to contain and retain a liquid body in circumfluous contiguity with the anterior surface of said eye and admit light rays to same, a pair of small windows having sealed-in transparent panes and threaded means of engaging a second tube on it exterior surface, and a pair of second tubes, each one of which is cooperative with an ocular-tube and carries artificial refractive means mounted in its end substantially as and for the purpose set forth.

35. An optical device of the character described comprising an ocular-tube having its open end curved and shaped to fit the anterior portion of an eye, its opposite end closed airtight by a plane, transparent closure to adapt it to contain and retain a liquid body in circumfluous contiguity with the anterior surface of said eye and admit light rays to same, means of showing to what depth the cornea is sunk in said liquid body, a threaded portion to its outer surface to engage a second tube thereon, and a second tube, having threads on its inner surface and carrying an artificial refractive body, cooperative with and threadably moved on said ocular-tube to approximate said refractive body to the dioptric system of said eye substantially as and for the purpose set forth.

36. An optical device of the character described comprising two ocular-tubes cooperative with each other, each one having its open end curved and shaped to fit the anterior portion of an eye, its opposite end closed airtight by a plane, transparent closure to adapt it to contain and retain a liquid body in circumfluous contiguity with the anterior surface of said eye and admit light rays to same, means of showing to what depth the cornea is sunk in said liquid body, a threaded portion to its outer surface to engage a second tube thereon, and a pair of second tubes, each one having threads on its inner surface and carrying an artificial refractive body, cooperative with and threadably moved on an ocular-tube to approximate said refractive body to the dioptric system of said eye substantially as and for the purpose set forth.

37. An optical device of the character described comprising an ocular-tube having its open end curved and shaped to fit the cumferentially the anterior portion of an eye with the axis of said tube in line with the axis of said eye, its opposite end closed airtight by a plane, transparent closure to adapt it to contain and retain a liquid body in circumfluous contiguity with the anterior surface of said eye and admit light rays to same, means for showing the depth to which the cornea of said eye is sunk in said liquid body, a second tube, cooperatively engaged on said ocular-tube, carrying a positive lens, means of securing said positive lens in said tube with its axis on a line with the axis of said tube, threaded means on both the ocular and the second tube to threadably move the second tube on said ocular tube to adjust said positive lens at points variously distanced from said eye substantially as and for the purpose set forth.

38. An optical device of the character described comprising a pair of ocular-tubes, each one having its open end curved and shaped to fit circumferentially the anterior portion of an eye with the axis of said tube in line with the axis of said eye, its opposite end closed airtight by a plane, transparent closure to adapt it to contain and retain a liquid body in circumfluous contiguity with the anterior surface of said eye and admit light rays to same, means of showing the depth to which the cornea of said eye is sunk in said liquid body, and a pair of second tubes, one of which is cooperatively engaged on each ocular-tube and carries a positive lens, means of securing said positive lens in the end of said tube with its axis on a line with the axis of its tube, threaded means on both the ocular-tube and the lens-tube to threadably move the lens-tube on the ocular-tube to adjust the positive lens at points variously distanced from said eye.

39. An optical device of the character described comprising an ocular-tube having its open end curved and shaped to fit circumferentially the anterior portion of an eye with the axis of said tube in line with the axis of said eye, its opposite end closed airtight by a plane, transparent closure to adapt it to contain and retain a liquid body in circumfluous contiguity with the anterior surface of said eye, and admit light rays to same, means of showing the depth to which the cornea of said eye is sunk in said liquid body, a second tube, cooperatively engaged on said ocular-tube, carrying a positive lens, means of securing said positive lens in said tube with its axis on a line with the axis of said tube, threads on both the ocular and second tube to threadably move the second tube on said ocular-tube to adjust said positive lens at points variously distanced from said eye, and a face-frame having a plurality of adjustable parts suitable to adapt it to support said ocular-tube and said lens-tube in operable position before said eye and to adapt the frame to the face substantially as and for the purpose set forth.

40. An optical device of the character described comprising a pair of ocular-tubes, each having its open end curved and shaped to fit circumferentially the anterior portion of an eye with the axis of said tube in line with the axis of said eye, its opposite end closed airtight by a plane, transparent closure to adapt it to contain a liquid body in circumfluous contiguity with the anterior surface of said eye and admit light rays to same, means of showing the depth to which the cornea of said eye is sunk in said liquid body, a pair of second tubes, one of which is cooperatively engaged on each ocular-tube and carries a positive lens, means of securing said positive lens in the end of said tube with its axis on a line with the axis of its tube, threads on both the ocular-tube and the lens-tube to threadably move the lens-tube on the ocular-tube to adjust the positive lens at points variously distanced from said eye, and a face frame having a plurality of adjustable parts suitable to adapt it to support said ocular-tubes and lens-tubes in operable and cooperative positions before the eyes and to adapt said frame to the face substantially as and for the purpose set forth.

41. An optical device of the character described comprising a pair of liquid-containing ocular-tubes having transparent means of admitting light rays through said liquid to the eyes, cornea-observing windows, a pair of cooperative lens-tubes, threaded means of engaging said lens-tubes telescopically over the free ends of said ocular-tubes, a pair of positive lenses, one mounted in the end of each lens-tube, means of adjustingly moving said lens-tubes on said ocular-tubes in directions of their axis to place said positive lenses at various points of refractive cooperation with the dioptric systems of eyes, and a frame, cooperative with said ocular-tubes and lens-tubes, having a pair of ocular-tube-engaging collars, means for connecting said collars to each other, means for supportingg the frame on the nose and means for securing the frame to the face substantially as and for the purpose set forth.

42. An optical device of the character described comprising a pair of liquid-containing ocular-tubes having means of admitting light rays through said liquid to the eyes, cornea-observing windows, a pair of cooperative lens-tubes, threaded means of engaging said lens-tubes telescopically over the free ends of said ocular-tubes, a pair of positive lenses, one mounted in the end of each lens-tube, means of adjustingly moving said lens-tubes on said ocular-tubes in directions of their axis to place said positive lenses at various points of refractive cooperation with the dioptric systems of the eyes, and a frame, cooperative with said ocular and lens tubes, having collars, formed of detachable sections, in which the ocular-tubes are adjustably secured, an oscillating member connected at each end with an annular collar to connect the said collars and form the front of the frame, means for supporting said front with its tubes on the bridge of the nose and means for securing the frame to the face substantially as and for the purpose set forth.

43. An optical device of the character described comprising a pair of liquid-containing ocular-tubes having means of admitting light rays through said liquid to the eyes, cornea-observing windows, a pair of cooperative lens-tubes, threaded means of engaging said lens-tubes telescopically over the free ends of said ocular-tubes, a pair of positive lenses, one mounted in the end of each lens-tube, means of adjustingly moving said lens-tubes on said ocular-tubes in directions of their axis to place said positive lenses at various points of refractive cooperation with the dioptric systems of the eyes, and a frame cooperative with said ocular and lens tubes, having collars for engaging the ocular-tubes, means of adjusting said tubes in said collars in directions of their axis, an oscillating member formed with a bridge-like portion and graduated end portions on which said collars are adjustably secured to approximate one ocular-tube and lens-tube to the other like set of tubes to bring the axes of said sets of tubes in line with the axis of their respective eyes, nosebridge means for supporting the assembled tubes and oscillating member on the bridge of the nose and means for securing the frame to the face substantially as and for the purpose set forth.

44. An optical device of the character described comprising a pair of liquid-containing ocular-tubes having means of admitting light rays through said liquid to the eyes, cornea-observing windows, a pair of cooperating lens-tubes, threaded means of engaging said lens-tubes telescopically over the free ends of said ocular-tubes, a pair of positive lenses, one mounted in the end of each lens-tube, means of adjustingly moving said lens-tubes on said ocular-tubes in directions of their axis to place said positive lenses at various points of refractive cooperation with the dioptric systems of the eyes, and a frame, cooperative with said ocular and lens tubes, having collars for engaging the ocular-tubes, means of adjusting said tubes in said collars in directions of their axis, an oscillating member formed with a bridge-like portion and graduated portions on which said collars are adjustably secured to approximate one ocular-tube and one lens-tube to the other like set of tubes to bring the axes of said sets of tubes in line with the axis of their respective eyes, a flexible nose bridge, mounted on the bridge-like portion of the oscillating member, having means for raising and lowering its crest and for bending it to fit the sides and the bridge of the nose, suitably adapting it to support the weight of the assembled device on the bridge and sides of the nose, and extensible and adjustable members for engaging the sides of the face and backs of the ears to secure the device on the face with the ocular-tubes fitted to the eyes substantially as and for the purpose set forth.

45. An optical device of the character described comprising two ocular-tubes cooperative with each other, each one having its open end curved and shaped to fit the anterior portion of an eye, its opposite end closed air tight by a plane, transparent closure to adapt it to contain and retain a liquid body in circumfluous contiguity with the anterior surface of said eye and admit light rays to same, a pair of windows for viewing the pole of the cornea, threaded means for engaging a second tube on its exterior surface, a pair of second tubes, each one of which is cooperative with an ocular-tube and carries a positive lens mounted in its free end, means for moving each positive lens in directions toward and away from the eye to positions of refractive cooperation with the dioptric system of same, and a frame having means for supporting in assembled relation the ocular-tubes and lens-tubes and for securing the frame on the face and the tubes in positions before the eyes, and a pair of graduated bars, each having a pointer at one end for indicating the said small windows of the ocular-tubes and a graduated portion extending over the surface of the lens-tube, said graduations and pointer adapting the bar for mensuration purposes in cooperation with the positive lens and the said small windows substantially as and for the purpose set forth.

46. An ocular tube adapted to contain a liquid medicament, means for placing both the tube and its contained liquid in juxtaposition with an eye, a second tube, means on said ocular tube for engaging said second tube, an artificial refractive body carried by said second tube on its exterior surface and means for approximating said artificial refractive body to place it in refractive cooperation with the dioptric system of said eye.

47. An ocular tube adapted to retain a liquid medicament in contact with an eye and admit light rays through same to said eye, a movable lens-tube carried by said ocular tube, and a converging lens carried by said lens-tube to cooperate in refraction with said liquid and with the dioptric refractive system of said eye.

48. In a combined medical and refractive device a liquid-medicament-containing ocular-tube having a plane transparent closure adapted to admit light rays through it and the liquid to an eye, a second tube screwing telescopically on said ocular-tube, and a converging lens carried in said second tube adapted to refractive cooperation with the liquid described and with the ocular medium and refractive surfaces of said eyes.

BENJAMIN E. BRIERTON.